3,466,348
POLYESTER MELT BLENDS
Maria V. Wiener, Akron, Ohio, assignor to The Goodyear Tire & Rubber Company, Akron, Ohio, a corporation of Ohio
No Drawing. Continuation of application Ser. No. 392,315, Aug. 26, 1964. This application Mar. 27, 1967, Ser. No. 626,342
Int. Cl. C08g 39/10, 39/04
U.S. Cl. 260—860                3 Claims

ABSTRACT OF THE DISCLOSURE

A melt blend of a crystallizable polyester and a flexible, essentially non-crystalline polyester makes good electrical insulation films, fibers, molded products, etc. Both polyesters are saturated, linear and thermoplastic and essentially free from ether linkages, and the acid units of both polyesters are derived from dibasic aromatic acids. The melt blend is formed from 10 to 85 weight percent of the crystallizable polyester, and 90 to 15 weight percent of the flexible polyester. At least 70 mol percent of the glycol units of the crystallizable polyester are derived from a glycol containing 2 to 4 carbon atoms. The remaining glycol units of the crystallizable polyester, if any, are derived from an aliphatic glycol containing up to 6 carbon atoms. The flexible polyester comprises glycol units containing 2 to 12 carbon atoms. The polyesters are melt-blended only so long as necessary, in order to minimize randomization. The melt blend has an intrinsic viscosity of at least 0.5.

---

This application is a continuation of my abandoned application Ser. No. 392,315 filed Aug. 26, 1964.

This invention relates to melt blends of (1) a rigid crystallizable polyester and (2) a flexible, essentially non-crystalline polyester. Both polyesters are linear and thermoplastic, and are derived from aliphatic glycols and aromatic dibasic acids.

The melt blends of this invention which are prepared from polyesters all of the acid units of which are units of aromatic acids are more stable to thermal and hydrolytic degradation than melt blends which comprise a substantial amount of aliphatic acid units. They are therefore especially suitable for use in applications where thermal hydrolytic stability of the product are important, such as for insulating electric conductors, for adhesives in laminations, for coatings, films and fibers, and may also be used for molding, etc.

The organic acids from which the different polyesters are formed are those aromatic dibasic acids used in common polyesters, including, for example, terephthalic acid, mixtures of terephthalic and isophthalic acids and the 1,5-, 2,6-, and 2,7-naphthalic acids, and mixtures of these various acids in suitable proportions.

The blends contain 10 to 85 weight percent of a rigid, crystallizable polyester and 90 to 15 weight percent of a flexible polyester. The melt blend is obtained by blending the polyesters hot on a mill, in a Banbury or in other suitable melt-blending equipment. The melt blending is carried out for only such a time interval that a homogeneous product is obtained. Prolonged melt blending is to be avoided because it leads to excessive randomization of blend components resulting in a product which has a lower-than-desired melting temperature.

The so-called rigid polyesters used in carrying out the invention are rigid or substantially rigid. They are crystallizable, and have melting points of at least 180° C. They are homo-polyesters of aromatic diacids and glycols containing 2 to 4 carbon atoms in a linear chain, namely, ethylene glycol, 1,3-propanediol and 1,4-butanediol, or copolyesters of such dibasic acids and such glycols together with up to 30 mol percent of another aromatic acid or another aliphatic glycol containing up to six carbon atoms. In other words, when only one aromatic acid is used, then from 70 to 100 mol percent of the glycol units in the crystallizable polyesters contain one of the glycols comprising 2 to 4 carbon atoms, and from 30 to 0 mol percent of the glycol units may contain up to 6 carbon atoms. All of the glycol units are often advantageously derived from one glycol.

These rigid polyesters include, for example, polyesters of the following molar compositions:

Poly(ethylene terephthalate/isophthalate),
  100/0 to 75/25;
Poly(ethylene/hexamethylene terephthalate),
  100/0 to 75/25;
Poly(ethylene/neopentyl terephthalate),
  100/0 to 75/25;
Poly(tetramethylene terephthalate/isophthalate),
  100/0 to 75/25;
Poly(tetramethylene/hexamethylene terephthalate),
  100/0 to 75/25;
Poly(tetramethylene/neopentyl terephthalate),
  100/0 to 75/25;
Poly(ethylene-2,6-naphthalate/terephthalate),
  100/0 to 75/25; and
Poly(tetramethylene-2,6-naphthalate/tetraphthalate),
  100/0 to 75/25; etc.

Mixtures of crystallizable polyesters with a melting point of at least 180° C. may be used.

The flexible polyesters are essentially non-crystalline. They do not have a sharp melting point and must possess a glass transition temperature of less than 20° C. They are derived from one or more aliphatic glycols which contain 2 to 12 carbon atoms. These glycols include, for example, tetramethylene glycol, pentamethylene glycol, hexamethylene glycol, decamethylene glycol, branched-chain glycols, ether glycols, etc. However, the homopolyester or copolyester used as the flexible component of the melt blend must be essentially non-crystaline and have a glass transition temperature of less than 20° C.

These flexible polyesters include, for example, polyesters of the following molar compositions:

Poly(hexamethylene terephthalate/isophthalate),
  50/50 to 25/75;
Poly(tetramethylene terephthalate/isophthalate),
  35/65 to 25/75;
Poly(pentamethylene terephthalate/isophthalate),
  50/50;
Poly(heptamethylene terephthalate/isophthalate),
  50/50;
Poly(ethylene/hexamethylene 30/70-terephthalate/isophthalate), 70/30 to 0/100; etc.

The rigid polyesters are crystalline, and the fact that they are relatively brittle and possess a low flex life makes then unsuited for various applications. By blending a flexible polyester with them a mixture characterized by a high melting temperature and high flexibility is obtained which has much greater practical utility for coatings, adhesives, extrudates, etc. than the crystallizable polyesters. The flexible polyesters impart to the melt blends, higher impact strength and a desirable degree of flexibility even at temperatures of zero centigrade and lower, whereas the crystallizable rigid polyesters impart to the polymer blends, higher service temperatures and higher tensile strengths which properties widen the field of usefulness of the polyesters. For this purpose, usually about 10 to 85 weight percent, and preferably 40 to 60 weight percent, of the crystallizable polyester will be used with 90 to 15 weight percent, and preferably 60 to 40 weight percent of the flexible polyester. Either or both polyesters may contain stabilizer, pigment and/or inert filler.

The aliphatic glycols to which this specification refers comprise (1) those with straight hydrocarbon chains such as ethyleneglycol, tetramethylene glycol, etc., (2) those with branched hydrocarbon chains such as, for example 1,2-propanediol, 2,5-dimethyl-1,6-hexanediol, etc., and (3) ether glycols, such as diethylene glycol, for example. A mixture of glycols may be used in preparing either of the polyesters used in the melt blend.

The following examples are representative. (The initials I.V. or IV are used to stand for intrinsic viscosity which is a measure of the degree of polymerization of the polymer, and is determined in the known manner in a 60/40 phenol-tetrachloroethane mixed solvent at 30° C.)

EXAMPLE 1

The following were melt-blended with stirring under nitrogen at 280° C. (bath) for twelve minutes:

30 g. poly(ethylene terephthalate) of 0.729 IV, having a melting point of 265° C., and
30 g. poly(hexamethylene terephthalate/isophthalate, 30/70) of 0.758 IV.

On removal from the mixer the product became hazy due to partial crystallization. On annealing in a 100° C. oven the product became opaque white within one minute, due to further crystallization. The blended product had an IV of 0.635 and a melting point of 250° C.; it was exceptionally tough and had high flexibility even at −10° C.

EXAMPLE 2

The following polymers were melt-blended with stirring, under nitrogen, at 265° C. (bath) for 15 minutes:

13 g. poly(tetramethylene terephthalate) of 0.738 IV, having a melting point of 230° C., and
20 g. poly(hexamethylene terephthalate/isophthalate 30/70) of 0.731 IV.

On removal from the mixer, the product crystallized rapidly, turning opaque white, even though spread in a relatively thin sheet about 10 mils thick. It had an IV of 0.717 and a melting range of 225 to 228° C. It was exceptionally tough and had high flexibility even at −10° C.

EXAMPLE 3

The following polyesters were melt-blended with stirring, under nitrogen, at 265° C. (bath) for 15 minutes:

12 g. poly(tetramethylene terephthalate) of 0.738 IV, having a melting point of 230° C., and
8 g. poly(hexamethylene terephthalate/isophathalte), 30/70 of 0.731 IV.

On removal from the blender, the product crystallized rapidly, turning opaque white, even when spread as a 10-mil sheet. It had an IV of 0.668, and melting range of 218 to 220° C. It was very tough and highly flexible.

The invention is covered in the claims which follow.

I claim:
1. A melt blend consisting essentially of
 (1) 10 to 85 weight percent of a crystallizable saturated polyester having a melting point of at least 180° C. and
 (2) 90 to 15 weight percent of a flexible, essentially non-crystallizable 1,6-hexamethylene glycol polyester having a glass transition temperature of less than 20° C.;
the melt blending being continued substantially only so long as necessary to produce a homogeneous product whereby randomization of the melt blend is minimized;
both polyesters being linear and thermoplastic,
the intrinsic viscosity of the melt blend being at least .05,
the acid units of both polyesters being terephthalate and isophthalate units in the molar ratio of 50/50 to 25/75,
70 to 100 mol percent of the glycol units of the crystallizable polyester being derived from glycols containing 2 to 4 carbon atoms with 30 to 0 mol percent being derived from glycols containing up to 6 carbon atoms, and
the glycol units of the flexible polyester containing 2 to 12 carbon atoms.

2, A melt blend consisting essentially of
 (1) 60 to 40 weight percent of a crystallizable poly(tetramethylene terephthalate) polyester having a melting point of at least 180° C., and
 (2) 60 to 40 weight percent of a flexible, essentially non-crystallizable poly(hexamethylene terephthalate/isophthalate 30/70) polyester having a glass transition temperature of less than 20° C.;
the melt blending being continued substantially only so long as necessary to produce a homogeneous product whereby randomization of the melt blend is minimized,
both polyesters being linear and thermoplastic, and
the intrinsic viscosity of the melt blend being at least .05.

3. The process which comprises melt blending
13 parts by weight of poly(tetramethylene terephthalate) of substantially 0.738 intrinsic viscosity and a melting point of substantially 230° C., with
20 parts by weight of poly(hexamethylene terephthalate/isophthalate 30/70) of substantially 0.731 intrinsic viscosity
at substantially 265° C. for substantially 15 minutes, and
allowing the resulting blend to crystallize rapidly to produce a blend with an intrinsic viscosity of substantially 0.717 and melting point of substantially 225 to 228° C.

References Cited

UNITED STATES PATENTS

| 3,381,058 | 4/1968 | Caldwell et al. | 260—860 |
| 3,382,295 | 5/1968 | Taylor | 260—860 |
| 2,623,031 | 12/1952 | Snyder | 260—860 |
| 3,037,960 | 5/1962 | Frazer | 260—860 |

FOREIGN PATENTS

| 766,290 | 1/1957 | Great Britain. |
| 769,405 | 3/1957 | Great Britain. |

OTHER REFERENCES

Kress Block Kondensation des Polyathylenterephthalats mit Polyestern Faseforschung und Textilttechnik, August 1960, vol. 11, No. 8, class 260, sub 860, pp. 353–359.

SAMUEL H. BLECH, Primary Examiner
J. T. GOOLKASIAN, Assistant Examiner

U.S. Cl. X.R.
260—75